United States Patent
Brenneman et al.

(10) Patent No.: US 8,589,875 B2
(45) Date of Patent: Nov. 19, 2013

(54) COMPUTING SYSTEM WITH COMPILE FARM

(75) Inventors: Robert J. Brenneman, Poughkeepsie, NY (US); Eli M. Dow, Poughkeepsie, NY (US); William J. Huie, Poughkeepsie, NY (US); Sarah J. Sheppard, Poughkeepsie, NY (US); Paul E. Sonnenberg, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 12/485,116

(22) Filed: Jun. 16, 2009

(65) Prior Publication Data
US 2010/0318965 A1 Dec. 16, 2010

(51) Int. Cl.
*G06F 9/44* (2006.01)

(52) U.S. Cl.
USPC .......................... 717/120; 717/124; 717/131

(58) Field of Classification Search
None
See application file for complete search history.

(56) References Cited

U.S. PATENT DOCUMENTS

| | | | |
|---|---|---|---|
| 5,167,024 A | 11/1992 | Smith et al. | |
| 5,623,647 A | 4/1997 | Maitra | |
| 5,937,190 A * | 8/1999 | Gregory et al. | 717/131 |
| 6,289,399 B1 | 9/2001 | Furuichi et al. | |
| 6,442,701 B1 * | 8/2002 | Hurd | 713/324 |
| 6,710,578 B1 * | 3/2004 | Sklovsky | 320/127 |
| 6,892,313 B1 | 5/2005 | Codilian et al. | |
| 6,922,788 B2 * | 7/2005 | Eberhard et al. | 713/320 |
| 7,010,708 B2 | 3/2006 | Ma | |
| 7,019,739 B2 | 3/2006 | Danis | |
| 7,142,204 B2 | 11/2006 | Shiotsu et al. | |
| 7,178,743 B2 | 2/2007 | Clarke, III et al. | |
| 7,290,246 B2 * | 10/2007 | Cyran et al. | 717/130 |
| 7,337,433 B2 * | 2/2008 | Cyran et al. | 717/130 |
| 7,446,773 B1 | 11/2008 | Alben et al. | |
| 7,774,172 B1 * | 8/2010 | Yunt et al. | 715/967 |
| 8,099,271 B2 * | 1/2012 | Schubert et al. | 717/124 |
| 2001/0044909 A1 | 11/2001 | Oh et al. | |
| 2002/0194509 A1 | 12/2002 | Plante et al. | |
| 2003/0191791 A1 * | 10/2003 | Cyran et al. | 709/100 |
| 2003/0191976 A1 * | 10/2003 | Cyran et al. | 713/340 |
| 2004/0041538 A1 * | 3/2004 | Sklovsky | 320/127 |
| 2004/0260957 A1 | 12/2004 | Jeddeloh et al. | |
| 2006/0005082 A1 | 1/2006 | Fossum et al. | |
| 2006/0130005 A1 * | 6/2006 | Nakamura | 717/135 |
| 2007/0168055 A1 | 7/2007 | Hsu et al. | |

(Continued)

OTHER PUBLICATIONS

Compile Farm From Wikipedia, the free encyclopedia [retrieved on Sep. 17, 2012]. Retrieved from the Internet<URL:http://en.wikipedia.org/wiki/Compile_farm>.*

*Primary Examiner* — Matt Kim
*Assistant Examiner* — Hua Lu
(74) *Attorney, Agent, or Firm* — Cantor Colburn LLP; Steven Chiu (57) ABSTRACT

A computer readable medium is provided and has instructions stored thereon, which, when executed cause a processor of a computing system to execute a method of controlling the computing system. The method includes iteratively running a workload over a period of time, the workload being defined by software components of a software repository of the computing system, measuring power consumption associated with the running of the workload with each iteration and storing data indicative of the power consumption, analyzing the data and identifying, from a result of the analysis, power consumption changes over the period of time, generating a regression profile based on the power consumption changes, and managing the software components in accordance with the regression profile.

14 Claims, 6 Drawing Sheets

(56) References Cited

U.S. PATENT DOCUMENTS

| | | |
|---|---|---|
| 2007/0234090 A1 | 10/2007 | Merkin et al. |
| 2009/0265519 A1 | 10/2009 | Moore et al. |
| 2010/0052421 A1 | 3/2010 | Schindler et al. |
| 2010/0306737 A1* | 12/2010 | Hamilton, II et al. ........ 717/110 |
| 2011/0239013 A1 | 9/2011 | Muller |

* cited by examiner

COMPUTING SYSTEM WITH COMPILE FARM

BACKGROUND

Aspects of the present invention are directed to a computing system with a compile farm.

Typically, little attention is given to power consumption considerations in software development processing. During the development phase of the software development processing, software testers may have access to data regarding iterative execution of testing frameworks but the data is rarely referred to by the software developers who actually write the software code. Indeed, it is traditional for the software developers to simply write the software code and send code drops to be built and tested by others.

The disconnection between the software developers and the data regarding the iterative execution of testing frameworks frequently leads to problems in the later execution of the software. These problems include, but are not limited to, the likelihood that regressions will exist between the code release date and feedback from performance testing of the code.

SUMMARY

In accordance with an aspect of the invention, a computer readable medium is provided and has instructions stored thereon, which, when executed cause a processor of a computing system to execute a method of controlling the computing system, the method including iteratively running a workload over a period of time, the workload being defined by software components of a software repository of the computing system, measuring power consumption associated with the running of the workload with each iteration and storing data indicative of the power consumption, analyzing the data and identifying, from a result of the analysis, power consumption changes over the period of time, generating a regression profile based on the power consumption changes, and managing the software components in accordance with the regression profile.

In accordance with another aspect of the invention, a method of controlling a computing system is provided and includes iteratively running a workload over a period of time, the workload being defined by software components of a software repository of the computing system, measuring power consumption associated with the running of the workload with each iteration and storing data indicative of the power consumption, analyzing the data and identifying, from a result of the analysis, power consumption changes over the period of time, generating a regression profile based on the power consumption changes, and managing the software components in accordance with the regression profile.

In accordance with another aspect of the invention, a computing system is provided and includes a compile farm memory unit, onto which software components of a software repository of the computing system are loadable, a plurality of devices relative to which iterative runs of a workload defined by the software components are executable over a period of time, and a processor, disposed in signal communication with the devices, which is configured to execute the iterative runs and to evaluate power consumption associated with the iterative runs by the devices. The processor includes a computer-readable medium having a set of instructions stored thereon, which, when executed, cause the processor to analyze data indicative of the power consumption, to generate a regression profile based on power consumption changes, and to manage the software components accordingly.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

Figure 1:
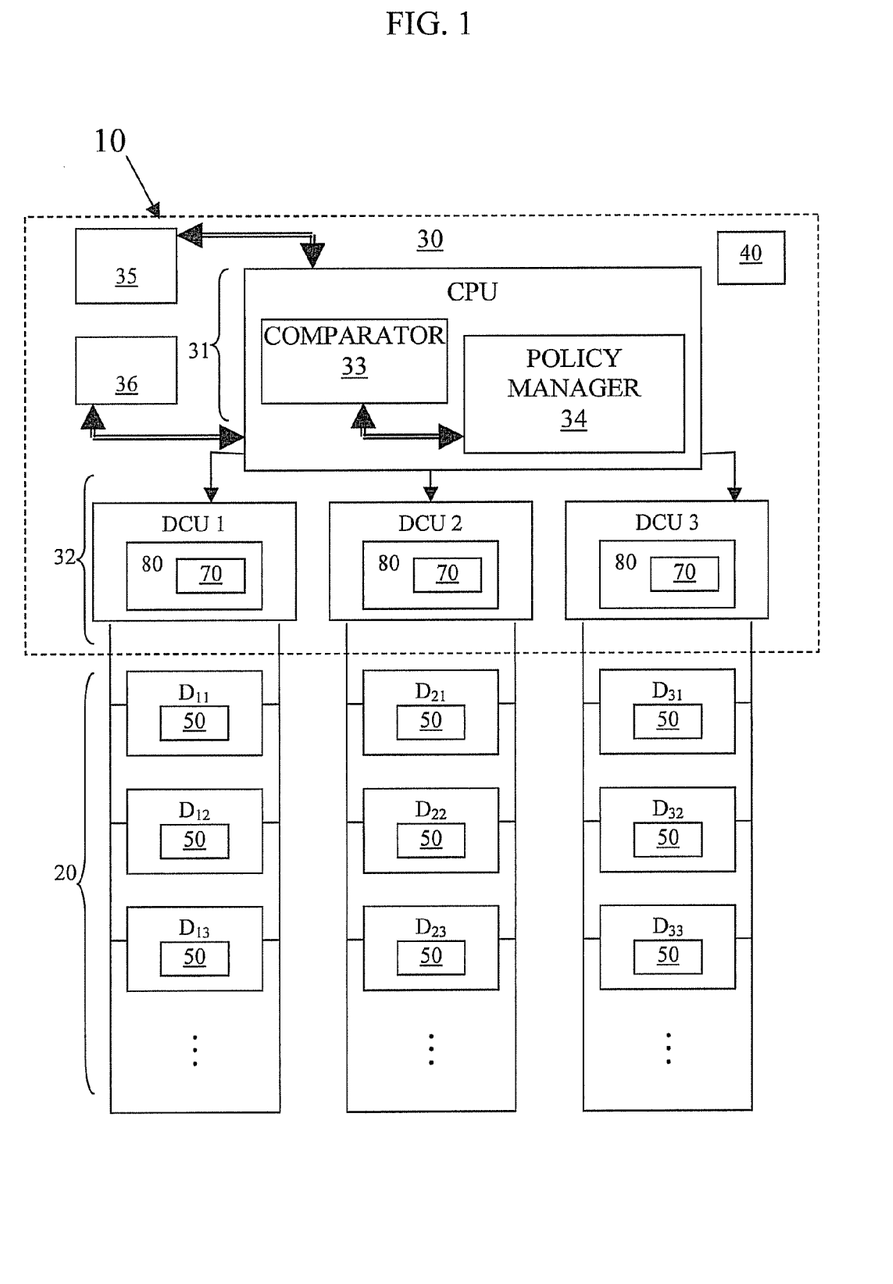
FIG. 1 is a schematic illustration of a computing system in accordance with embodiments of the invention.

With reference to FIG. 1, a computing system 10 is provided. The computing system 10 may be a personal computer or an enterprise computing system with multiple servers and client devices at possibly remote locations. The computing system 10 includes devices, such as recording media 20, relative to which iterative runs of a workload defined by software components of a software repository 36 of the computing system 10 are executable over a period of time, a processor 30 and, in some cases, a power source 40 by which a quantity of available power is made available.

The processor 30 is disposed in signal communication with the devices and is configured to execute the iterative runs and to evaluate power consumption associated with the iterative runs by the devices. To this end, the processor 30 includes a memory unit 35. The memory unit 35 includes a computer-readable medium having a set of instructions stored thereon, which, when executed, cause the processor 30 to analyze data indicative of the power consumption, to generate a regression profile based on power consumption changes, and to manage the software components accordingly.

As will be described below, the processor 30 may include multiple processing levels arranged in a tree format that includes a top level 31, at which a central processing unit (CPU) may reside, and a bottom level 32, at which one or more disk control units (DCU 1, DCU 2 and DCU 3) reside. Additional processing levels may, of course, be provided between the top and bottom levels 31 and 32. I/O operations are normally instantiated at the top level 31 as the CPU receives and interprets inputted read and write commands. The CPU then assigns components of the iterative runs and/or the I/O operations downstream in accordance with, e.g., read power requirements until they reach each of the various DCUs at the bottom level 32 as components of the iterative runs and atomized I/O operations. Each of the components of the iterative runs and atomized I/O operations is then carried out at a recording medium 20 coupled to an associated one of the DCUs.

The recording media 20 may include removable media that can be removably coupled to the computing system 10 or non-removable media that are normally coupled to the computing system 10. They may also include recording media, such as a universal serial bus (USB) flash drive, an optical disk, a DVD-ROM, etc., from which information is read or onto which information is written in accordance with the executions of the iterative runs and the I/O operations. In any case, each recording medium 20 is provided with a power requirement gauge 50. The power requirement gauge 50 is readable by the processor 30 and provides an indication to the processor 30 as to how much power is required for the iterative runs and/or for an I/O operation to be executed with respect to the recording medium 20.

As shown in FIG. 1, each DCU is normally associated with a set of devices acting as recording media. Thus, DCU 1 is associated with devices $D_{11}$, $D_{12}$, $D_{13}$, ..., in such a way as to allow DCU 1 to manage the executions of I/O operations of those devices and to read their respective power requirements indicated by their respective power requirement gauges 50. Similarly, DCU 2 is associated with devices $D_{21}$, $D_{22}$, $D_{23}$, ..., in such a way as to allow DCU 2 to manage the executions of the iterative runs and the I/O operations of those devices and to read their respective power requirement gauges 50 and, finally, DCU 3 is associated with devices $D_{31}$, $D_{32}$, $D_{33}$, ..., in such a way as to allow DCU 2 to manage the executions of the iterative runs and the I/O operations of those devices and to read their respective power requirement gauges 50.

Figure 2:
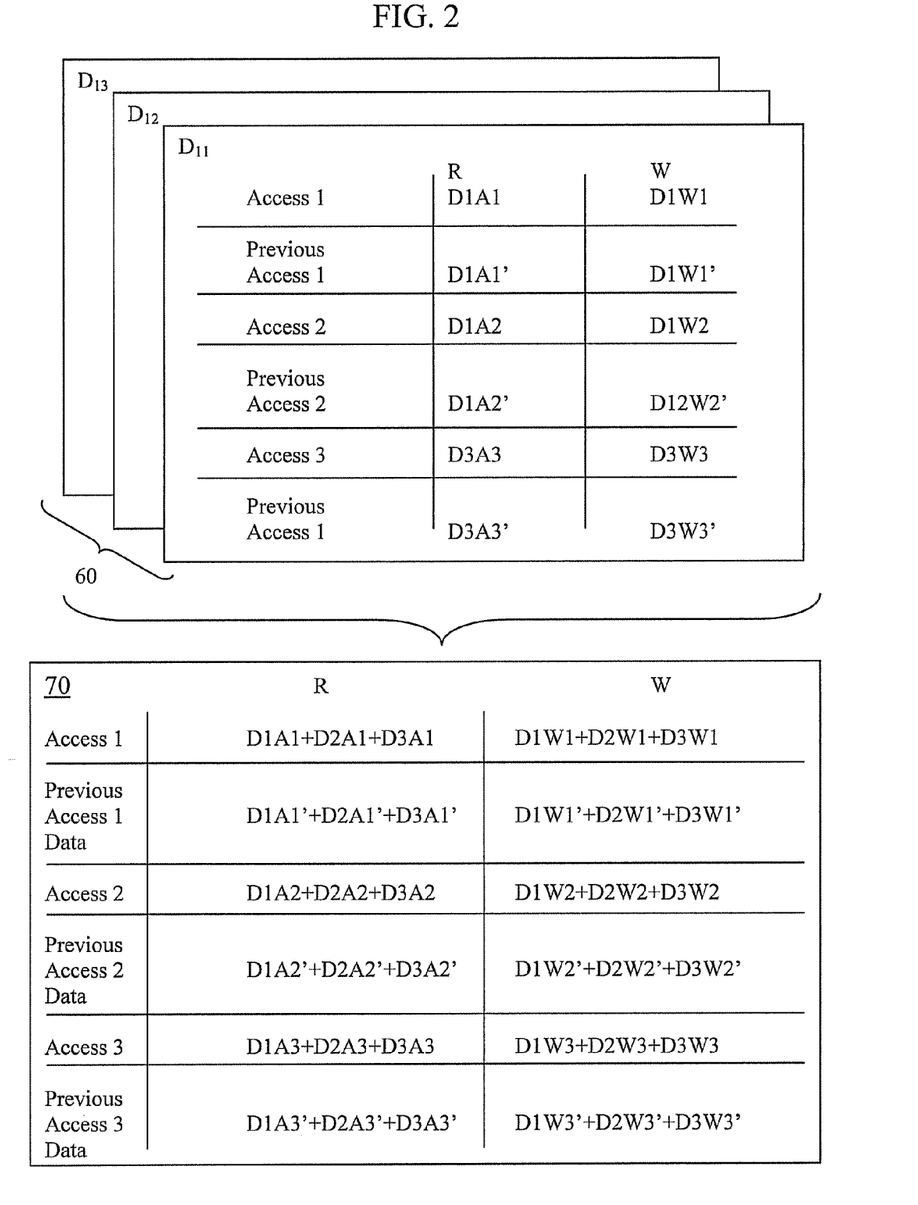
FIG. 2 is a schematic illustration of registers, which may include simple registers or more complex machine addressable I/O storage units, in use by the computing system of FIG. 1.

In accordance with an embodiment of the invention and, as shown in FIG. 2, the power requirement gauge 50 for each device may indicate the respective power requirement for executing the iterative runs and/or an I/O operation of the device in the form of a register 60. That is, each register 60 may be configured to describe the power requirement for its device for each read (R) and each write (W) access incidence of any component of the iterative runs and/or any I/O operation executed with respect to the associated device. Thus, at a particular time, device $D_{11}$ requires D1A1 and D1W1 power for read and write operations of access 1, D1A2 and D1W2 power for read and write operations of access 2 and D1A3 and D1W3 power for read and write operations of access 3, and so on. Each register 60 may further be configured to indicate previous access data (i.e., D1A1', D1A2', etc.) that is periodically updated and reflective of power requirements of previous read and write access incidences.

The register 60 for each device is readable by the DCU to which that device is associated. Thus, DCU 1 reads the registers 60 of devices $D_{11}$, $D_{12}$ and $D_{13}$, DCU 2 reads the registers 60 of devices $D_{21}$, $D_{22}$ and $D_{23}$, and so on. Information gleaned from the registers 60 may then be compared with the quantity of power available for I/O operations (this being more important where the computing system 10 is being run with battery power) and is then employed by DCU 1 to schedule the executions of the I/O operations relative to devices $D_{11}$, $D_{12}$ and $D_{13}$ or to refuse the executions of the I/O operations in accordance with the quantity of available power. As will be described below, the information can also be employed in the generation of regression profiles of the software components of the software repository 36.

The information gleaned from the registers 60 of devices $D_{11}$, $D_{12}$ and $D_{13}$ is also aggregated at the DCU 1 register 70 where it can be stored, at least temporarily, in memory unit 80, which is disposed in relative association with the DCU 1. The DCU 1 register 70 includes information reflective of the total power requirement for access incidences of I/O operations for devices $D_{11}$, $D_{12}$ and $D_{13}$ along with information reflective of historical power requirements for devices $D_{11}$, $D_{12}$ and $D_{13}$.

The DCU 1 register 70 along with registers for any other DCUs in computing system 10 can be transmitted to higher processing levels, such as top level 31, where additional I/O operation assignments can be made. Where the information is employed in the generation of the regression profiles, the information is transferred to at least a comparator 33 of the processor 30 at the top level 31, where the regression profiles are generated, as will be described below.

Figure 3:
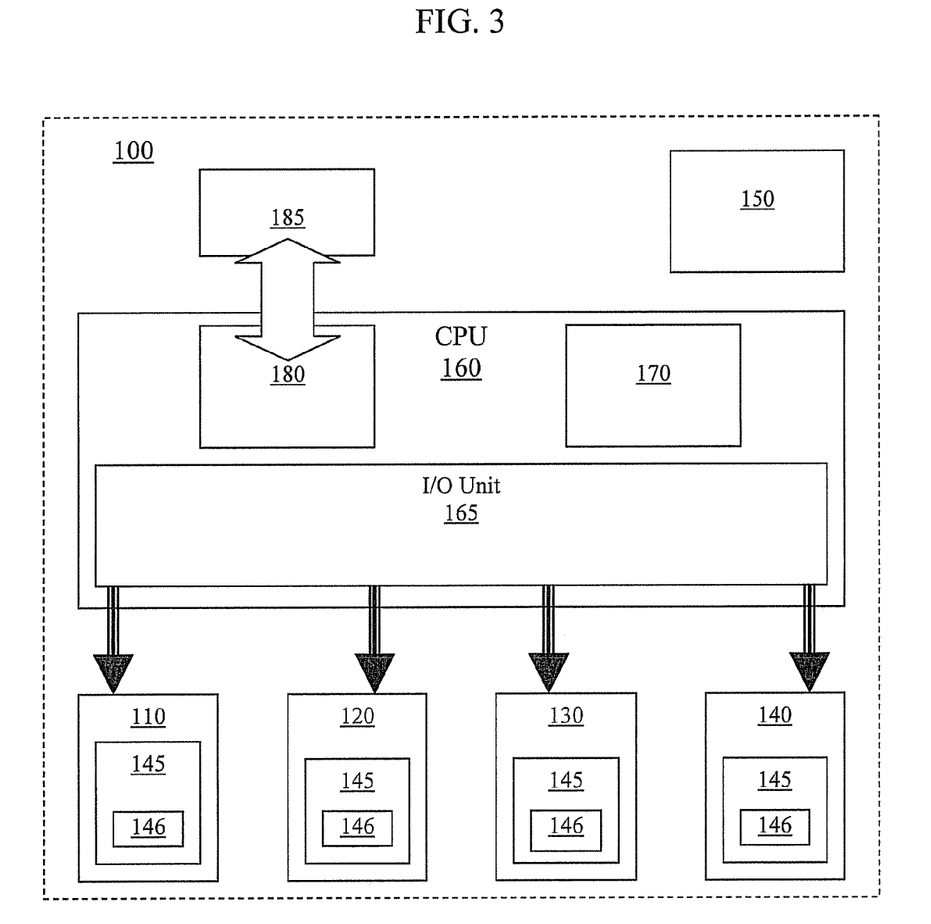
FIG. 3 is a schematic illustration of a personal computer in accordance with embodiments of the invention.

With reference to FIG. 3 and, in accordance with an aspect of the invention, a computing device 100 is provided. The computing device 100 may include devices, such as a universal serial bus (USB) flash drive 110, an optical disk drive 120, a DVD player 130 and a hard disk drive 140, relative to which iterative runs of a workload defined by software components are executable over a period of time, a power source 150, such as a lithium-ion rechargeable battery, and a processor 160, such as a central processing unit (CPU). Each recording medium includes a power requirement gauge 145 and a register 146 that are configured in a similar manner as described above. The power source 150 is coupled to the recording media and the processor 160 and makes available a quantity of power. A display unit 185 controlled by a display driver 180 of the processor 160 are also provided for interaction with a user of the computing device 100.

The processor 160 is coupled to the power source 150 and includes an I/O unit 165, which is disposed in signal communication with the devices. The processor 160 is thereby configured to execute the iterative runs and to evaluate power consumption associated with the iterative runs by the devices by way of the I/O unit 165. To this end, the processor 160 includes a memory unit 170. The memory unit 170 may be a computer-readable medium having a set of instructions stored thereon. When executed, the instructions cause the processor 160 to analyze data indicative of the power consumption, to generate a regression profile based on power consumption changes, and to manage the software components accordingly.

Figure 4:
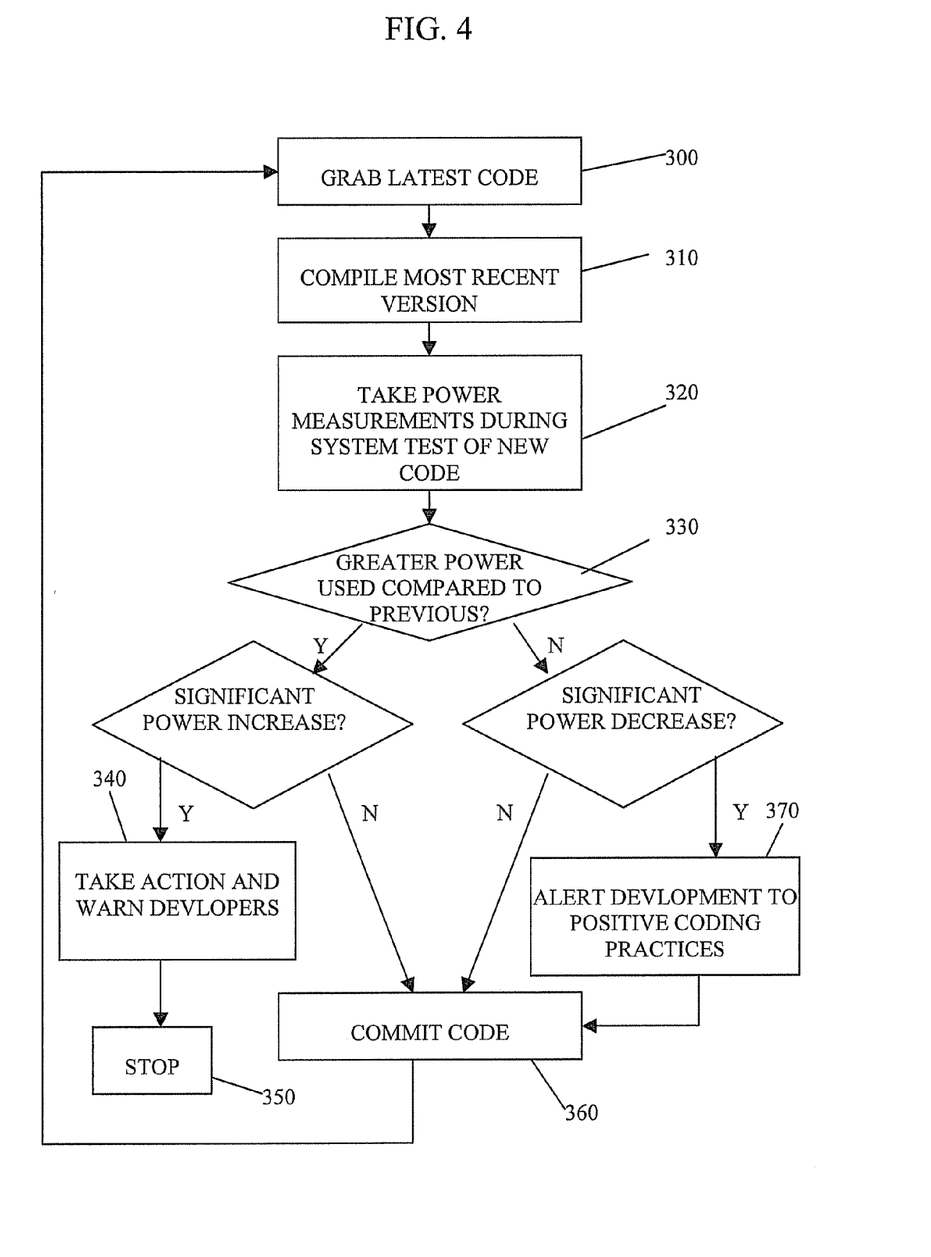
FIG. 4 is a flow diagram illustrating a method of determining whether a code revision should be committed.

With reference to FIG. 4 and, in accordance with yet another aspect of the invention, the registers 60 of the recording media 20 of computing system 10 can be further employed in the analysis of new code. That is, as new code is written and tested, the registers 60 can provide an indication as to whether executions of the new code will be more or less power intensive than those of previously used code.

As shown in FIG. 4, a late version of code is grabbed 300 and compiled 310. Power measurements provided by the registers 60 are then taken 320 during system tests of the late version code. At this point, it is determined whether the late version code is more or less power intensive than previous versions 330. If the late version is more power intensive and if the increase is significant, a warning may be issued to developers 340 and the method ended 350. Alternatively, if the increase is relatively insignificant, the late version code may be committed 360 despite the power increase with control then returned to operation 300. If, on the other hand, the late version is less power intensive, the late version code could simply be committed 360, or, if the decrease is significant, an alert could be additionally sent out to alert developers of positive coding practices 370.

Figure 5:
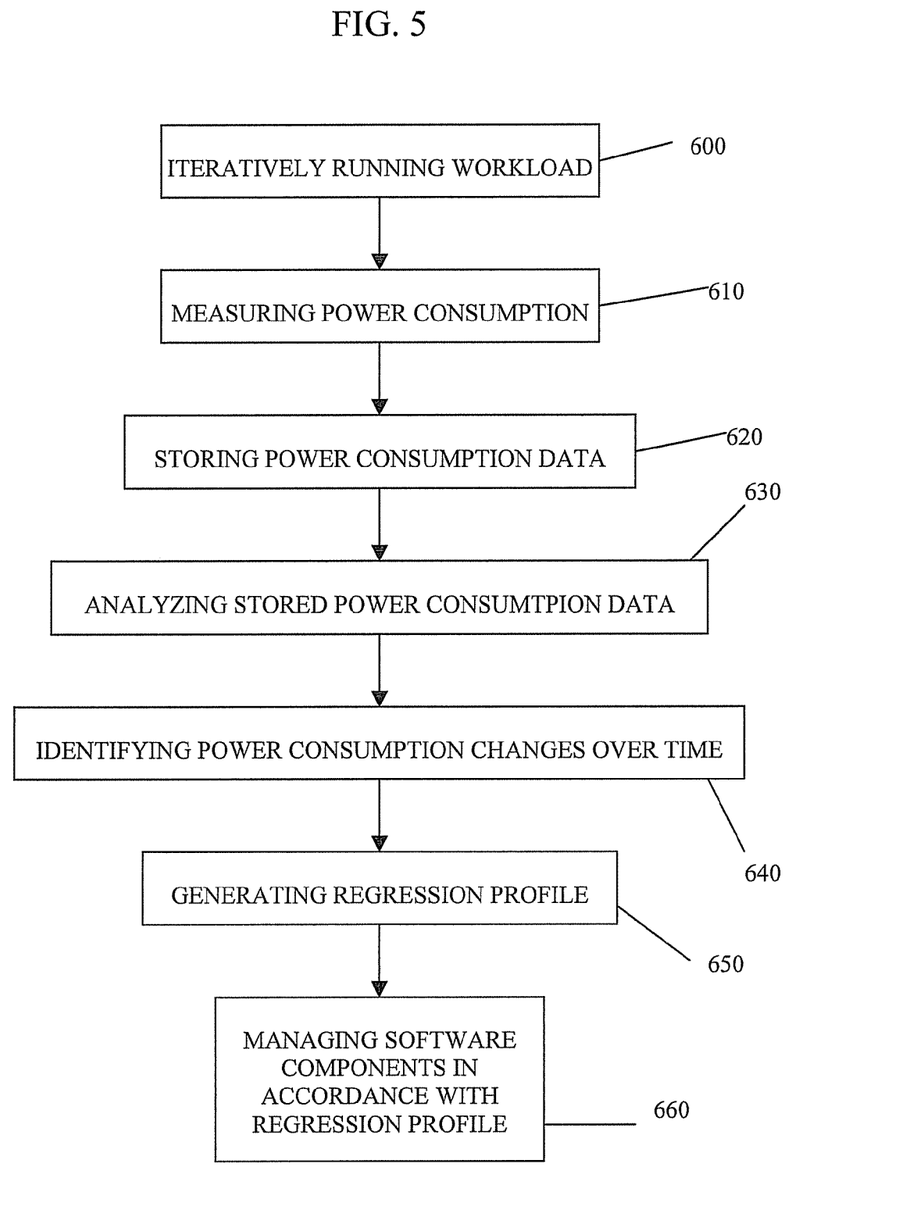
FIG. 5 is a flow diagram illustrating a method of controlling a computing system in accordance with embodiments of the invention.

In accordance with yet another aspect of the invention and, with reference to FIGS. 1 and 5, the memory unit 35 may include a computer readable medium having instructions stored thereon, which, when executed cause the processor 30 of the computing system 10 to execute a method of controlling the computing system 10. The method includes iteratively running a workload over a period of time 600, with the workload being defined by software components of a software repository 36 of the computing system 10. Power consumption associated with the running of the workload with each of the iterations is then measured 610 at the recording media 20, which are disposed in relative association with the computing system 10 and power consumption data, which is indicative of the power consumption, is stored 620.

The power consumption measurements of operation 610 may be achievable by way of readings of the power requirement gauges 50 of each of the devices. In this way, the power consumption data over the period of time may be entered into the registers 60 for each device and transmitted up through the various processing levels 32 and 31 of the processor 30. The power consumption measurements could also be achieved by system level aggregate power consumption gauges, in addition to, or in the absence of device specific power consumption gauges, such as a kilowatt/hr meter, to measure the total power draw of the system under test conditions. including all components which need to have power consumption measured.

The power consumption data is then analyzed 630 at, e.g., a comparator 33 of the processor 30 or the CPU and power consumption changes over the period of time during which the iterative runs of the workload are conducted are identified from a result of the analysis 640. The method then includes generating a regression profile at the comparator 33 based on the power consumption changes 650. Finally, a policy manager 34, which is coupled to the comparator, manages the software components in accordance with the regression profile 660.

Figure 6:
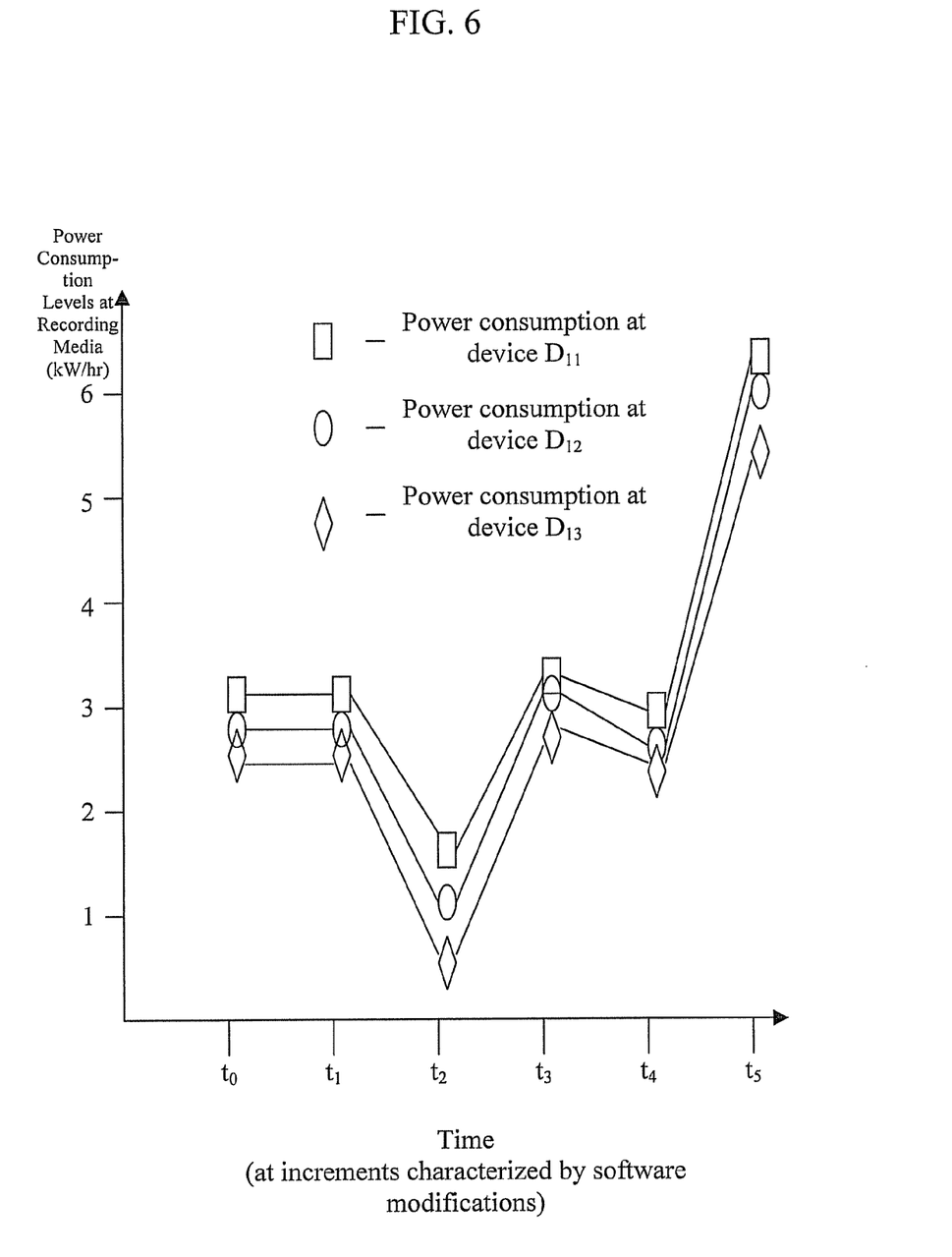
FIG. 6 is a graph illustrating power consumption levels at various devices of a computing system vs. time.

With reference to FIG. 6 and, in accordance with an embodiment of the invention, the analysis of the power consumption data may include plotting the power consumption data against time for one or more devices of the computing system 10. For example, as shown in FIG. 6, devices $D_{11}$, $D_{12}$ and $D_{13}$ consume respective quantities of power (in, e.g., kW/hr) at times $t_0$, $t_1$, $t_2$, $t_3$, $t_4$ and $t_5$. In this example, it is assumed that each time increment is characterized by the software components of the software repository 36 being modified in some manner. These modifications may be, e.g., patches to the software components, additions of new functions or other similar changes.

The graph of FIG. 6 suggests that each of the modifications at times $t_0$, $t_1$, $t_3$, and $t_4$ can be associated with variable but generally similar power consumption levels at devices $D_{11}$, $D_{12}$ and $D_{13}$ while the modifications at times $t_3$ and $t_5$ can be associated with a significant power consumption level decrease and increase, respectively. From the graph, it can be seen that the modifications occurring at those times should be automatically and/or manually managed further.

In accordance with various embodiments of the invention, whether a power consumption level increase or decrease is judged to be significant or not can be determined automatically in view of a default setting, automatically in view of a predefined threshold and/or manually. That is, a default setting may be employed to set forth that a power increase or decrease following a software modification is only to be considered significant if it represents, e.g., at least a 10% change in a power consumption level at a device relative to a previous power consumption level at that device. Conversely, it is to be understood that a developer, who is developing a code patch that is expected to increase power consumption levels in return for added functionality, could manually set forth that, e.g., only power consumption level increases of 20% or more should be considered significant.

The regression profile generated at operation 650 sets forth information which is, at least, indicative of those software modifications that result in significant power consumption level increases and decreases. The regression profile is then transmitted to the policy manager 34 where the software components of the software repository 36 can be managed accordingly. The management may include deleting the modification and/or alerting the relevant developers if it is found that the modification can be associated with a significant increase in power consumption levels that is not, for example, balanced by an appropriate level of additional software functionality. Such an alert could serve to advise the developers of coding practices that are not necessarily positive. Alternatively, the modification could be amended, such that the power consumption level increase is reduced or such that a less power intensive device is actuated in the execution of the modification. Still further, in an event the modification is associated with a power consumption level decrease or insignificant increase, the modification could be committed. Here, the management may further include alerting the developers as to positive coding practices such that they can be employed in future modifications.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A non-transitory computer readable medium having instructions stored thereon, which, when executed cause a processor of a computing system to execute a method of controlling the computing system, the method comprising:
   iteratively running a workload over a period of time, the workload being defined by software components of a software repository of the computing system and including a late version of code and a previous version of the code;
   measuring power consumption associated with the running of the late version of the code and the previous version of the code and storing data indicative of the power consumption;
   analyzing the data and identifying, from a result of the analysis, power consumption changes over the period of time between the running of the late version of the code and the running of the previous version of the code, wherein the analyzing comprises plotting the data against time;
   generating a regression profile based on the power consumption changes to identify modifications included in the late version of the code but not the previous version of the code that result in the power consumption changes, wherein the identifying comprises identifying power consumption changes exceeding a predefined threshold; and
   managing the software components associated with the identified modifications in accordance with the regression profile.

2. The computer readable medium according to claim 1, wherein the measuring comprises measuring power consumption at recording media disposed in relative association with the computing system.

3. The computer readable medium according to claim 1, wherein the generating of the regression profile comprises identifying a modification included in the late version of the code at a time of the threshold exceeding power consumption change.

4. The computer readable medium according to claim 3, wherein the managing comprises:
   deleting the modification in an event the modification is associated with increased power consumption;
   amending the modification to reduce an increase in power consumption associated with the modification; and
   committing the modification in an event the modification is associated with decreased power consumption.

5. The computer readable medium according to claim 1, further comprising alerting developers of the software components of at least one of the generated regression profile and the managing of the software components.

6. A method of controlling a computing system, the method comprising:
   iteratively running a workload over a period of time, the workload being defined by software components of a software repository of the computing system and including a late version of code and a previous version of the code;
   measuring power consumption associated with the running of the late version of the code and the previous version of the code workload with each iteration and storing data indicative of the power consumption;
   analyzing the data and identifying, from a result of the analysis, power consumption changes over the period of time between the running of the late version of the code and the running of the previous version of the code, wherein the analyzing comprises plotting the data against time;
   generating a regression profile based on the power consumption changes to identify modifications included in the late version of the code but not the previous version of the code that result in the power consumption changes, wherein the identifying comprises identifying power consumption changes exceeding a predefined threshold; and
   managing the software components associated with the identified modifications in accordance with the regression profile.

7. The method according to claim 6, wherein the measuring comprises measuring power consumption at recording media disposed in relative association with the computing system.

8. The method according to claim 6, wherein the generating of the regression profile comprises identifying a modification included in the late version of the code at a time of the threshold exceeding power consumption change.

9. The method according to claim 8, wherein the managing comprises:
   deleting the modification in an event the modification is associated with increased power consumption;
   amending the modification to reduce an increase in power consumption associated with the modification; and
   committing the modification in an event the modification is associated with decreased power consumption.

10. The method according to claim 6, further comprising alerting developers of the software components of at least one of the generated regression profile and the managing of the software components.

11. A computing system, comprising:
    a compile farm memory unit, onto which software components of a software repository of the computing system are loadable;
    a plurality of devices relative to which iterative runs of a workload defined by the software components and including a late version of code and a previous version of the code are executable over a period of time; and
    a processor, disposed in signal communication with the devices, which is configured to execute the iterative runs and to evaluate power consumption associated with the iterative runs of the late version of the code and the previous version of the code by the devices, the processor including:
    a non-transitory computer-readable medium having a set of instructions stored thereon, which, when executed, cause the processor to analyze data indicative of the power consumption between the running of the late version of the code and the running of the previous version of the code, wherein the analyzing comprises plotting the data against time, to generate a regression profile based on power consumption changes to identify modifications included in the late version of the code but not the previous version of the code that result in the power consumption changes, wherein the identifying comprises identifying power consumption changes exceeding a predefined threshold, and to manage the software components associated with the identified modifications accordingly.

12. The computing system according to claim 11, wherein the devices comprises recording media having gauges, which are readable by the processor, disposed thereon.

13. The computing system according to claim 11, wherein the processor comprises:
    a comparator to conduct to the data analysis; and
    a policy manager to conduct the managing.

14. The computing system according to claim 11, wherein the computer system comprises system level aggregate power consumption gauges to measure a power draw of the computing system under test conditions.

* * * * *